July 3, 1934.  G. A. LYON  1,965,528
METHOD OF APPLYING BEADING TO TIRE COVERS
Filed June 10, 1931
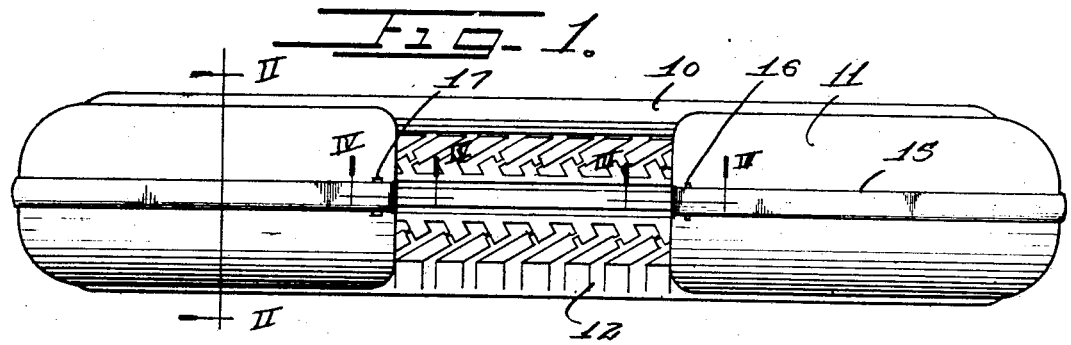
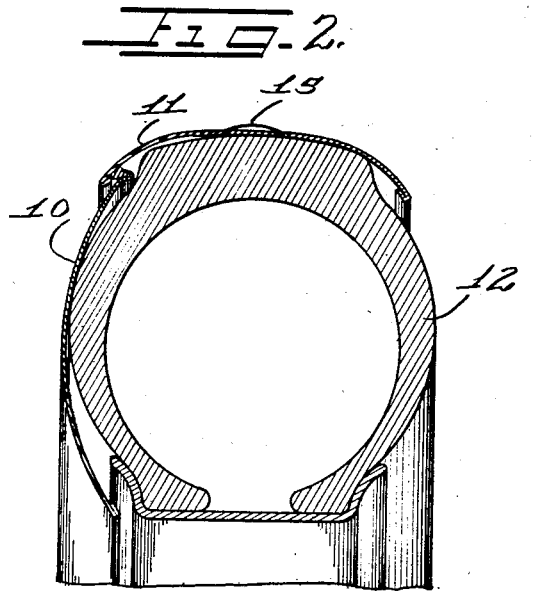
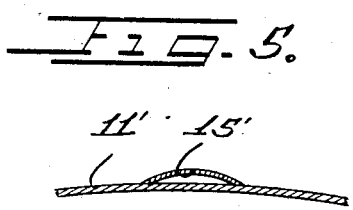
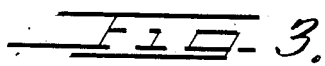
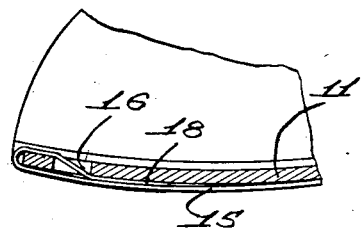
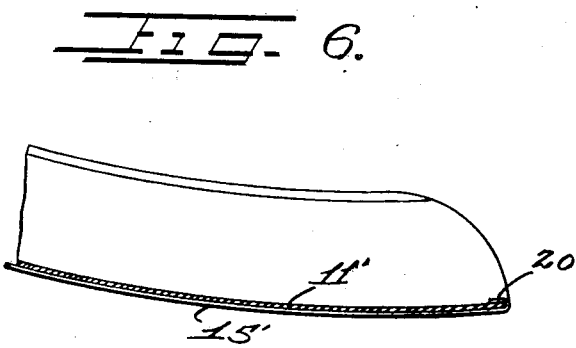
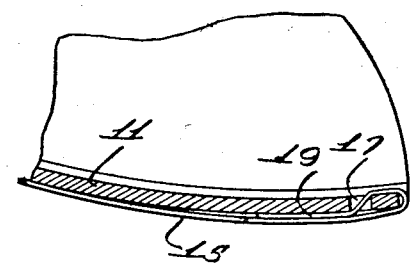
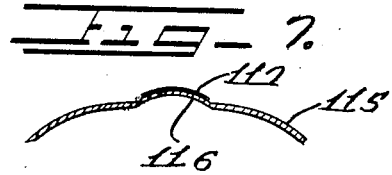
Inventor
George Albert Lyon.
by:
Attys.

Patented July 3, 1934

1,965,528

UNITED STATES PATENT OFFICE 1,965,528

METHOD OF APPLYING BEADING TO TIRE COVERS

George Albert Lyon, Allenhurst, N. J., assignor to Lyon Incorporated, Asbury Park, N. J., a corporation of Delaware Application June 10, 1931, Serial No. 543,335

10 Claims. (Cl. 113—116)

This invention relates to a beaded tire cover and to a method of applying the beading to the cover.

The object of the invention is to provide an improved and greatly simplified method of applying beading to a tire cover.

In accordance with the general features of the invention, there is provided a method of applying beading to a tire cover member which consists in doubling back each end of the bead strip on itself and onto the underside of a corresponding end of the cover member on which the beading is being mounted, inserting said doubled back end into a slot in said end of the cover member and under the beading proper on the cover member and then allowing the natural elasticity of the material in the beading to frictionally bind said inserted end of the beading tightly to said end of the cover member.

Other objects and features of this invention will more fully appear from the following detail description taken in connection with the accompanying drawing which illustrates several embodiments thereof, and in which Figure 1 is a bottom view of a spare tire cover applied to a tire which cover is provided with beading in accordance with the features of this invention.

Figure 2 is a fragmentary transverse cross-sectional view taken through Figure 1 on the line II—II of Figure 1.

Figures 3 and 4 are enlarged fragmentary sectional views taken on the lines III—III and IV—IV of Figure 1.

Figures 5 and 6 are fragmentary sectional views illustrating a modification of the invention.

Figure 7 is still another fragmentary sectional view similar to the section view of the beading shown in Figure 2 and illustrating a circumferential rib in the cover for supporting the beading.

At this time I wish to point out that while the present invention has been illustrated in connection with the so-called Lyon multi-part tire cover, the invention is not to be thus limited but only insofar as defined by the scope and spirit of the appended claims.

Further, it is thought that the steps of my novel method may be fully understood from a description of the beading and the manner in which it is secured to the peripheral member of the cover.

The cover illustrated in the accompanying drawing is made of two parts commonly referred to as a side plate and a split peripheral rim. These two parts are designated by the reference numerals 10 and 11 respectively. In applying this cover to the tire 12 the ring-like side plate 10 is first placed on the tire and then the split rim 11 is mounted on the tire so as to embrace the tread thereof and to overlap the side plate 10 for the purpose of retaining it in proper position on the tire. In other words, the tire cover is self retained on the tire 12.

My present invention is concerned with a beading strip for the rim 11 and the method of applying the same to the rim.

The beading strip 15 shown in Figures 1, 2, 3 and 4 may be made of any suitable material such for example as stainless steel of the non-hardened type. Strip 15, as will be observed from Figures 2 and 5, is of a convex cross section whereby its side edges are adapted to engage and bite into the outer surface of the rim member 11 as will clearly appear with the progress of the present description.

The two ends of the rim 11 are provided with transverse slots 16 and 17 designed to receive the ends of the beading strip 15 applied thereto.

In applying the beading strip 15 to the rim member one end of the strip is doubled back upon itself as shown in Figure 3 and around the corresponding end of the split rim 11 whereby the free end of the strip may be inserted through the slot 16 and under a portion of the strip on the outer periphery of the rim member as indicated at 18 in Figure 3.

Thereafter the strip is drawn taut and its other end is doubled back around the other end of the rim 11 as shown in Figure 4 and inserted through the slot 17 whereby the free portion of this end of the strip is also placed under a portion of the strip on the outer periphery of the rim as indicated at 19 in Figure 4.

Thereafter the natural elasticity of the beading strip 15 will cause it to pull away from its ends, thus causing its ends to be frictionally bound to the ends of the rim 11. In other words, in drawing or rolling the strip 15 taut to apply its second end to the rim as shown in Figure 4 the strip 15 is stretched and naturally the inherent elasticity of the material of the strip will thereafter tend to cause the strip to contract and thus bind the ends of the strip to the ends of the rim member.

In Figures 5 and 6 I have illustrated a modification of the invention in which a beading strip 15' of relatively heavy steel strip material is applied to the outer periphery of a rim member 11' similar to the rim 11.

According to this form of the invention, each end of the strip is doubled back over the corresponding end of the rim member 11' as indicated at 20 and is pressed into tight engagement with the under side of the rim at its extremities. The characteristics of the material comprising this strip 15' are such that after the ends of the strip are pressed into cooperation with the ends of the rim as shown at 20 the material will set and will thus firmly anchor the strip to the rim.

In Figure 7 I have illustrated still another modification of the invention in which the split rim 115 is provided with a convex circular rib 116 over which the convex beading strip 117 is disposed. The ends of this beading strip may be secured to the ends of the rim member 115 by either of the two methods previously described.

It should also be noted that each of the beading strips 15 and 15' are preformed so as to have a convex cross section. Also the strip 15' due to the relatively heavy material of which it is composed is preformed into a circular shape so as to enable it to be applied about the outer periphery of the rim member 11'.

The stainless steel strip 15 however does not require such circumferential preforming since it may be readily rolled about the outer periphery of the rim. Further this stainless steel strip 15 when in position has its side edges in tight contact with the outer surface of the rim 11 whereby these edges in effect bite into the surface of the rim.

Now I desire it understood that although I have illustrated and described in detail several embodiments of my invention, the invention is not to be thus limited, but only insofar as defined by the scope and spirit of the appended claims.

I claim as my invention:

1. The method of applying beading to a tire cover which consists in doubling back each end of the bead strip on itself and onto the under side of a corresponding end of the cover member on which the beading is to be mounted, inserting said doubled back end into a slot in said end of the cover member and under the beading proper on the cover and then allowing the natural elasticity of the material in the beading to frictionally bind said inserted end of the beading tightly to said end of the cover member.

2. The method of applying beading to a circular split rim-like member which consists in placing the beading strip over the outer periphery of the member and doubling back each end of the strip under the corresponding end of the rim member in such a manner as to allow the elasticity of the material in the beading strip to frictionally bind the ends of the strip to the ends of the rim member.

3. The method of applying a beading strip to the outer periphery of an annular split member which consists in placing the beading strip around the outer periphery of said split member, doubling back the ends of the beading strip over the ends of the split member and utilizing the inherent structural characteristics of the material in the beading strip to frictionally bind the ends of the strip to the ends of the split member.

4. The method of applying a beading strip having a convex cross section to an annular split member which consists in disposing the strip about the outer periphery of the split member with the side edges of the beading strip in contact with the periphery of the split member, doubling back the ends of the beading strip around the ends of the split member and utilizing the inherent structural characteristics of the material in said strip to anchor the ends of the strip to the ends of the split member whereby the beading strip is frictionally bound to the outer periphery of the split member throughout the length of the beading strip.

5. The method of applying a beading strip having a convex cross section to an annular split member which consists in disposing the strip about the outer periphery of the split member with the side edges of the beading strip in contact with the periphery of the split member, doubling back the ends of the beading strip around the ends of the split member and utilizing the inherent structural characteristics of the material in said strip to anchor the ends of the strip to the ends of the split member whereby the side edges of said convex beading strip are caused to frictionally bite into the outer periphery of the split member.

6. The method of applying a beading strip having a convex cross section to a circular rib having a convex cross section on an annular split member which consists in placing the beading strip around the outer periphery of the split member directly over the rib of said split member and doubling back the ends of the beading strip over the ends of the split member whereby the strip is frictionally bound to the split member and is self secured thereto.

7. The method of applying a beading strip to the outer periphery of a given circular member which consists in disposing the strip around the outer periphery of said member, doubling back an end of the strip on itself and onto the under side of said member and utilizing the inherent structural characteristics of the material comprising the strip to cause said end of the strip to be frictionally anchored to the said member.

8. The method of applying beading to a tire cover member which consists in doubling back each end of the bead strip on itself and onto the under side of a corresponding end of the cover member to which the beading is to be mounted, inserting said doubled back end into a slot in said end of the cover member and under the beading proper on the cover and then allowing the natural elasticity of the material in the beading to frictionally bind said inserted end of the beading tightly to said end of the cover member.

9. The method of attaching a strip of molding to the surface of a longitudinally arcuate part of a tire cover, which consists in securing one end of the strip to the cover part, rolling the strip circumferentially about the cover part, contemporaneously tensioning the strip to cause it to be applied in taut condition to the cover part and securing the other end of the strip to the cover part while the strip is taut.

10. The method of attaching a strip of molding to the surface of a longitudinally arcuate part of a tire cover, which consists in securing one end of the strip to the cover part, rolling the strip circumferentially about the cover part, contemporaneously tensioning the strip to cause it to be applied in taut condition to the cover part and securing the other end of the strip to the cover part while the strip is taut by pressing said end of the strip into interlocked engagement with said part.

GEORGE ALBERT LYON.